(12) United States Patent
Pertl et al.

(10) Patent No.: US 7,162,136 B1
(45) Date of Patent: Jan. 9, 2007

(54) NON-CIRCULAR, MECHANICALLY VARIABLE OPTICAL ATTENUATOR

(75) Inventors: Franz Andreas Johannes Pertl, Morgantown, WV (US); Frederick J. Nassauer, Quogue, NY (US); James E. Smith, Bruceton Mills, WV (US)

(73) Assignee: West Virginia University, Morgantown, WV (US)

( * ) Notice: Subject to any disclaimer, the term of this patent is extended or adjusted under 35 U.S.C. 154(b) by 0 days.

(21) Appl. No.: 11/021,824

(22) Filed: Dec. 22, 2004

(51) Int. Cl.
*G02B 6/00* (2006.01)

(52) U.S. Cl. ......................................... 385/140; 385/11
(58) Field of Classification Search ............... 385/4–11, 385/14, 140, 147; 359/227–236, 483–502
See application file for complete search history.

(56) References Cited

U.S. PATENT DOCUMENTS

| | | | |
|---|---|---|---|
| 3,437,401 A | 4/1969 | Siksai | 350/159 |
| 4,299,444 A | 11/1981 | Romer | 350/278 |
| 4,530,600 A | 7/1985 | Lopez | 356/5 |
| 4,572,619 A | 2/1986 | Reininger et al. | 350/392 |
| 5,521,744 A | 5/1996 | Mazurek | 359/267 |
| 5,642,236 A | 6/1997 | Mazurek | 359/840 |
| 5,652,745 A | 7/1997 | Noguchi et al. | 369/110 |
| 6,275,323 B1 | 8/2001 | Fukushima | 359/280 |
| 6,476,966 B1 | 11/2002 | Hernandez et al. | 359/484 |
| 6,512,624 B1 | 1/2003 | Tonar et al. | 359/265 |
| 6,525,860 B1 | 2/2003 | Holz et al. | 359/251 |
| 6,628,452 B1 | 9/2003 | Haeberle et al. | 359/298 |
| 6,631,238 B1 * | 10/2003 | Liu et al. | 385/140 |
| 6,700,692 B1 | 3/2004 | Tonar et al. | 359/265 |
| 6,717,713 B1 | 4/2004 | Onaka et al. | 359/281 |

* cited by examiner

*Primary Examiner*—Phan Palmer
(74) *Attorney, Agent, or Firm*—Steptoe & Johnson, PLLC

(57) ABSTRACT

A non-circular, mechanically variable optical attenuator using a pair of specially constructed polarizing elements with means enabling a gradual transition from un-crossed polarization vector fields to crossed polarization vector fields using a linear motion with respect to one another. The polarizing elements whose polarization axis varies with spatial position on the element have a polarization vector field that is a function of position on the element. Specifically, the two polarizing elements have a defined orientation of polarization axes or vectors on the polarization vector fields that vary with spatial location on the polarizing element such that when aligned light passes, and when the polarization axes are crossed, light is attenuated. The present attenuator has a practical application for dimmable mirrors or windows by providing a variable optical attenuator that is purely mechanical and non-circular in shape. Dimming of the mirror or window is controlled by gradually sliding one such special polarizer with respect to the other.

19 Claims, 9 Drawing Sheets

NON-CIRCULAR, MECHANICALLY VARIABLE OPTICAL ATTENUATOR

BACKGROUND OF THE INVENTION

1. Field of Invention

This invention relates to a non-circular mechanically variable optical attenuator using a pair of specially constructed polarizing elements to achieve a smooth transition from un-crossed to crossed polarized vector fields using a linear motion with respect to one another in place of circular motion. More specifically, the present invention uses mechanical translation and two non liquid polarizing elements through which light can pass with spatially varying polarization axes to achieve variable attenuation.

2. Related Art

In order to obtain a continuously variable optical attenuator, various methods can be used. One such method is to use polarizers. It is generally known in the art that a polarizer refers to a polarizing filter that has two transparent surfaces similar to a glass lens and other optical elements. Electrical and mechanical means for controlling the degree of attenuation through misalignment of the polarization vectors (or crossing of the polarizers) exist.

In common place electric control, a controlling voltage is usually applied to a liquid crystal cell to vary attenuation. This voltage changes the orientation of the liquid crystal molecules (usually aligned in a twisted helical shape) and thereby varies the misalignment (or twist in this case) of linearly polarized light to another, fixed, solid polarizer. This same principle is used in the common Liquid Crystal Displays (LCD). Light passes through a solid linear polarizer, then its polarization gets rotated by the liquid crystal helix, reflected and passes back out through the solid linear polarizer. The controlling electric field temporarily destroys the helix.

One common configuration of a mechanical variable optical attenuator involves a pair of polarizers which are gradually misaligned (or crossed) through rotation of one of the polarizers with respect to the other, leading to increasing optical attenuation. The circular mechanical motion required for crossing polarizers is not always easily achievable due to mechanical constraints. In an application, such as dimming of side and rear view mirrors on a vehicle for glare reduction, rotation is not practical as most of these mirrors are not circular in shape. The use of liquid crystal attenuators in this application is problematic as the liquid crystals are susceptible to damage from the environment such as UV radiation and heat, both present in ordinary sunlight. The availability of ordinary stable polarizers that could be gradually crossed with a linear rather than a circular motion could greatly benefit this and other applications where the previously outlined methods are inconvenient or impractical.

Various variable optical attenuators are disclosed in the literature. For example, U.S. Pat. No. 4,299,444 issued on Nov. 10, 1981 to Römer claims a variable dimmable mirror by electronically controlling a liquid crystal cell. The mirror assembly consists of polarizing filters, a liquid crystal cell, a voltage source for the electrodes of the cell and a reflective surface.

U.S. Pat. No. 6,717,713 issued Apr. 6, 2004 to Hiroshi Onaka et al. Claims a light attenuator by rotation of two linear polarizers with respect to one another but does not employ the use of linear translation of two polarizers with spatial variation of the polarization axis.

U.S. Pat. No. 6,628,452 issued Sep. 30, 2003 to Walter Haeberle et al claims a device usable as an optical switch (for matrix switching) It is not a variable attenuator.

U.S. Pat. No. 6,631,238 issued Oct. 7, 2003 to Hongdu Liu et al. Claims the use of birefringent crystals to separate the input light of the device into first ordinary and first extraordinary beams, separated by a walk off distance. The patent then claims the use of a half wave plate, a variable polarization rotator and a retroreflector to rotate and reflect the beams. However, there is a need for an attenuator which uses only specially constructed polarizers where the polarization axis varies over the surface of the polarizers resulting in attenuation through linear translation of one polarizer with respect to the other.

In a patent issued Mar. 2, 2004 to William L. Tonar, et al., U.S. Pat. No. 6,700,692, a partially reflective, partially transmissive electrochromic mirror, a light sensor, a display, a control circuit, and rearview mirror housing are claimed. The sensors provide input into a control circuit, which adjusts the attenuation of the mirror. The problem with the prior art is that attenuation is achieved through an electric field as opposed to mechanical translation with specially constructed polarizers.

U.S. Pat. No. 6,525,860 issued to Michael Holz et al. on Feb. 25, 2003 claims a device which uses diffraction, an array of liquid crystal regions and an electric field for controlling the attenuation. Given this prior art, there is a need for an attenuator functioning by mechanically translating two solid polarizers with spatially varying polarization axis to achieve variable light attenuation.

U.S. Pat. No. 6,476,966 issued to Florencio E. Hernández et al. on Nov. 5, 2002 claims an optical device for rotation of the polarization of linearly polarized infrared, visible, and ultraviolet radiation, comprising: an input transparent window with oriented surface coating, an output transparent window with oriented surface coating, a twisted Nematic liquid crystal disposed between said coated windows, a spacer located between the input window and the output window, means for facilitating proper alignment and precise adjustment of the spacer, and control means that when continuously rotating in a first direction continuously rotates one of said input window and said output window, in a second direction opposite to the first direction, whereby the direction of polarization of linearly polarized radiation entering conductive yet transparent coatings, which upon application of a voltage causes the rotation to be switched off. This device is then disposed between broadband polarizers to form a wavelength independent optical attenuator, where the incident light is a laser between $10^{13}$–$10^{15}$ Hz. The device further claims a control means including a rotatable screw for allowing an enhanced precision rotation of one of said input window and said output window, a rotatable knob for allowing an enhanced precision rotation of one of said input window and said output window, a motor for rotating the control means in a precision rotation, and a drive belt connecting the motor to the control means. A need remains for an attenuator that achieves variable attenuation through mechanical translation through solid polarizers with a spatially varying polarization axis as opposed to rotation of polarizers and liquid crystal cells as implemented by the prior art.

Additionally, U.S. Pat. No. 6,275,323 issued to Nobuhiro Fukushima on Aug. 14, 2001 claims an optical light amplifier, an optical attenuator variably attenuating the amplified light without mechanically moving along an optical path of the amplified light, wherein the apparatus is a repeater. The optical attenuator comprises a controller controlling the attenuation of the optical attenuator by varying an output of the optical attenuator. The optical attenuator attenuates the amplified light at an output of the optical amplifier. That patent also claims apparatus comprising an optical amplifier amplifying a light and an optical attenuator including a polarizing part and a polarization rotation part, which operate together to variably attenuate the amplified light, wherein the apparatus is a repeater. That patent also claims an optical communication system. However, there remains a need for mechanical crossing of polarizers through translation whereas the prior art relies upon magneto optical crystals and controlling magnetic fields.

U.S. Pat. No. 4,530,600 issued to Marco A. Lopez on Jul. 23, 1985 claims an adjustable rotatable polarization altering means positioned in the first optical path between the light source and a beam splitter means for rotating by controllable amount the polarization of light passing there through, thereby controlling the relative intensities of the component beams of the light intercepted by a beam splitter means and of that light transmitted along said second optical path thereby reducing controllably the intensity of the light directed toward a target. The use of rotational polarization by the prior art leaves a void that could be fulfilled by the use of varying spatial polarization through solid polarizers.

Further, U.S. Pat. No. 5,642,236 issued Jun. 24, 2997 to Niel Mazurek claims a dimmable safety mirror being adaptable for mounting to a conventional motor vehicle mirror comprising: a dimmable mirror subassembly having a dimmable surface selectively switchable between at least a high reflectance state and a low reflectance state, and a means for mounting the dimmable mirror to the conventional mirror in a manner to make the dimmable surface a viewing surface of the safety mirror wherein the dimmable mirror subassembly can be quickly and easily removed to make the conventional mirror the viewing surface. This patent also claims the dimmable mirror surface of the mirror subassembly is a dichroic liquid crystal mirror, and the dimmable safety mirror receives electrical power from the motor vehicle's electrical system. Given the prior art's reliance on dichroic and/or liquid crystal material and electrical power to achieve attenuation, there remains a need for a simpler attenuator which utilizes varying spatial polarization.

Similarly, U.S. Pat. No. 5,521,744 issued on May 28, 1996 also to Neil Mazurek focuses on the housing of the safety mirror. The patent claims a dimmable safety mirror comprising a mirror comprising a dimmable front reflective surface and rear reflective surface and the front surface is switchable between a high reflectance state and a low reflectance state. That patent also claims the dimmable mirror surface is a dichroic liquid crystal mirror and the dimmable safety mirror is powered. Again, a need is created for an attenuator that does not achieve attenuation through varying surface reflectivity as in the prior art.

U.S. Pat. No. 4,572,619 issued to Siegfried Reininger et al. on Feb. 25, 1986 claims an electrically dimmable rearview mirror. However, the use of an electro-optical effect of a thin ceramic layer, which is controlled through an applied electric field and claimed by the prior art is not useful for the applications that require a polarizing attenuator of mechanical means.

U.S. Pat. No. 6,512,624 issued to Toner et al. on Jan. 28, 2003 claims an electrochromic rearview mirror comprising: front and rear elements each having front and rear surfaces and being sealably bonded together in a spaced-apart relationship to define a chamber, a transparent first electrode including a layer of conductive material carried on a surface of one of said elements, an electrochromic material contained in said chamber, and a partially transmissive, partially reflective second electrode disposed over substantially all of said front surface of said rear element, said second electrode including a transparent coating applied over a surface of said rear element, element and a thin reflective layer of metal applied over said transparent coating, wherein said electrochromic rearview mirror exhibits a reflectance of at least about 35 percent, a C* value of less than about 20. This patent also claims a silver alloy as the reflective surface on the order of 180–500 Angstroms thick. The reliance of the prior art on electrochromic material or an applied electric field to achieve attenuation creates a need for an attenuator that does not utilize electrochromic material or an applied electric field.

SUMMARY OF THE INVENTION

Accordingly, in solving the problems associated with the prior art, it is an aspect of the present invention to provide for a not exclusively circular, but arbitrarily shaped (depending on application needs), Mechanically Variable Optical Attenuator with application for dimmable mirrors and transmissive applications such as window glass by providing a variable optical attenuator that is purely mechanical. The disclosed invention consists of using a pair of specially constructed polarizing elements with means enabling a gradual transition from un-crossed polarization vector fields to crossed polarization vector fields using a linear motion with respect to one another in place of circular motion. This is achieved through polarizing elements whose polarization axis varies with spatial position on the element thereby comprising a polarization vector field that is a function of position on the element. Rather than using the conventional terminology of a single polarization axis for a polarizer, this disclosure talks of a polarization vector field to highlight the fact that the polarization axis of the polarizer varies with spatial position over the polarizer. Thus, the present invention makes practical the construction of durable, mechanically smooth variable optical attenuators that are non-circular in shape and do not require a rotational motion to achieve attenuation. As an example, a mechanically dimmable mirror of non-circular shape is an embodiment. If the motion is specified to be a purely linear translation, then the dimming is easily controlled by gradually sliding (in a straight line) one such special polarizer with respect to the other. To achieve this through linear motion, two polarizing elements have a defined orientation of polarization axes or vectors comprising a polarization vector field that varies with spatial location on the polarizing element such that when light passes and when the polarization axes are crossed, light is attenuated.

Another aspect of the invention is that it is a linear translation of two polarizing elements with spatial variation of the polarization axis. Another aspect of the invention is that attenuation is not achieved by application of an electric field, diffraction, or an array of liquid crystals.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 1:
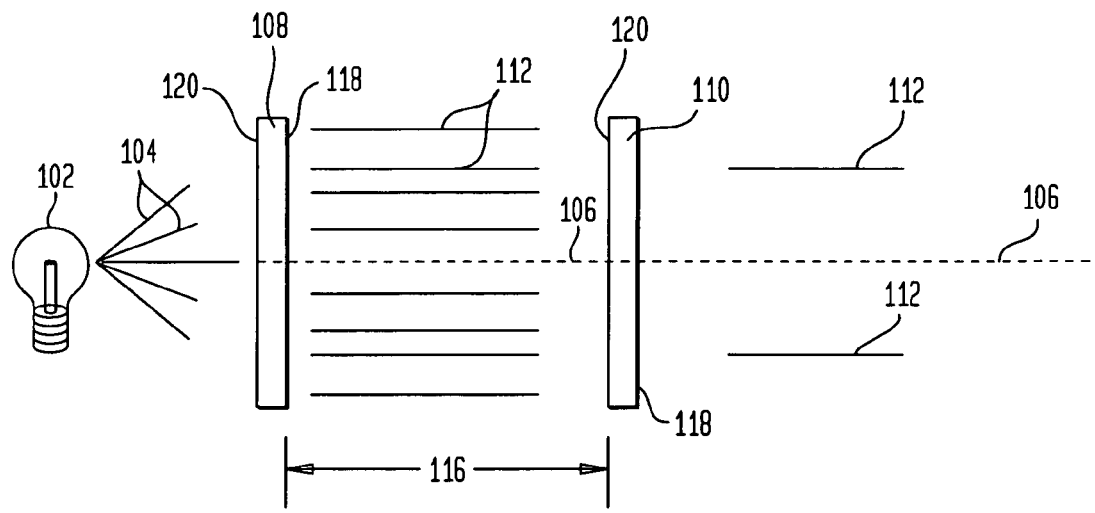
FIG. 1 is an illustrated schematic view of two polarizing elements.

Preferred embodiments of the present invention are described below in detail with reference to the accompanying drawings. Referring more particularly to FIG. 1, white light 104, from a light source 102, is shown. It would be readily apparent to one skilled in the art that other forms of light, such as monochromatic light, single frequency light, as well as polychromatic light could be readily applied to the invention herein described and are alternative embodiments of the invention and that white light 104 is used for the purpose of convenience only. Additionally, it would be equally apparent to one skilled in the art that other forms of electromagnetic radiation including infrared radiation, ultraviolet radiation, and radio waves in addition to visible light are alternative embodiments of the present invention.

FIG. 1 illustrates white light 104 traveling through a first polarizing element 108 and a second polarizing element 110 along a propagation axis 106. Polarized light 112 results when white light 104 passes through the first polarizing element 108 wherein only light 104 with a specific angle of vibration passes through.

The distance between the first polarizing element 108 and the second polarizing element 110 is a pre-defined distance 116. The preferred pre-defined distance 116 is no more than ¼ inch.

In the preferred embodiment of the invention, the first and second polarizing elements 108, 110 are substantially flat. Each polarizing element 108, 110 comprises substantially parallel incident (front) 118 and outlet (back) surfaces 120.

Assume now an orthogonal coordinate system with the propagation axis 106 being a z-axis. Using the coordinate system as a reference, the incident (front) surfaces 118 and the outlet (back) 120 surfaces of the first and second polarizing elements 108, 110 preferably are perpendicular to the propagation axis 106 in the present invention. Note that the propagation axis 106 may be redirected through the use of mirrors as is commonly done when an optical system is folded.

In an alternative embodiment, the first and second polarizing elements 108, 110 are not perpendicular to the propagation axis 106. In this embodiment, the first and second polarizing elements 108, 110 are no more than 30 degrees skewed from perpendicular to the propagation axis 106. If more than 30 degrees from perpendicular, the invention loses viability.

Figure 2A:
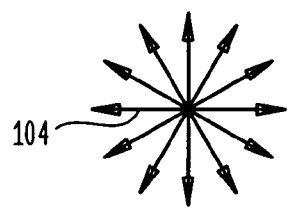
FIG. 2a is an illustration of ordinary light.

To one skilled in the art, white light 104 vibrates in all planes as illustrated in FIG. 2a. Additionally, it is well known in the art that white light 104 is often decomposed into a collection of transverse electromagnetic waves made up of mutually perpendicular, fluctuating electric and magnetic fields. Commonly, and for purposes herein, only the electric field vector is discussed as the magnetic field component is essentially the same, but with a 90 degree rotation about the propagation axis.

Figure 2B:
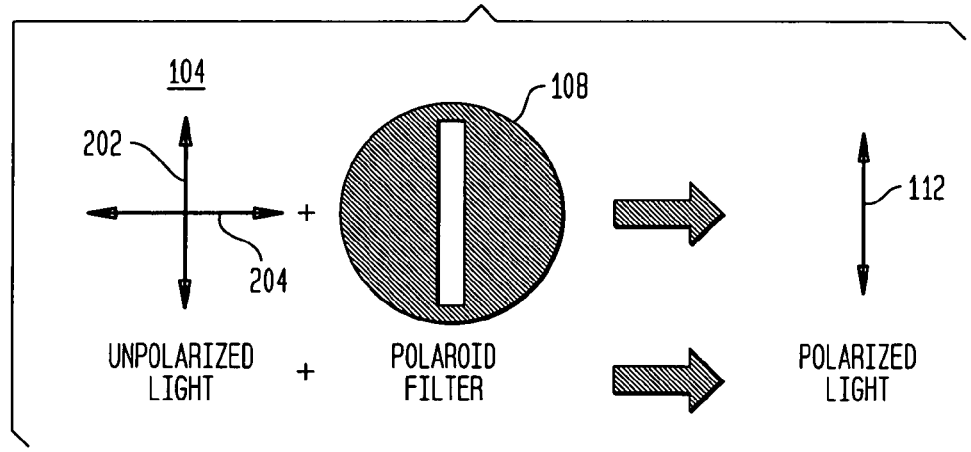
FIG. 2b is an illustrated schematic view of polarization.

Equally apparent to one skilled in the art, and for the purposes of aiding the description herein, randomly polarized or un-polarized white light 104 can also be thought of as a superposition of light waves vibrating in a vertical (y-coordinate) 202 and in a horizontal (x-coordinate) 204 plane. This is illustrated in FIG. 2b. It is also commonly known in the art that the horizontal and vertical direction components, 204, 202 of the light 104 can be expressed as perpendicular to a z-axis. Again, for the purposes of aiding in this description, the z-axis corresponds to the wavefront propagation axis 106 of white light 104 traveling through a first and second polarizing element 108, 110.

As illustrated in FIG. 2b, un-polarized white light 104 when passed through a first polarizing element 108, becomes polarized light 112. White light 104 is considered to be linearly polarized 112 when it contains waves that only fluctuate along one specific direction, such as the vertical 202 or horizontal 204 direction as is also illustrated in FIG. 2b. Thus, white light 104 passing through a polarizing element will result in only that light with a specific angle of vibration (or "polarization") passing through. This is polarized light 112.

As is commonly understood, an optical axis is usually through the center of all optical elements of an optical system, parallel to the light propagation. When two polarizing elements 108, 110 (or polarizers) are set up in a series so that their polarization vectors and optical axes are aligned (also referred to as being in phase, parallel, or uncrossed) light will then pass through both polarizing elements 108, 110.

However, if the polarization vectors are set up oriented 90 degrees with respect to each other (crossed), the polarized light 112 from the first polarizer 108 is attenuated by the second polarizer 110. As the angle rotates from 0 to 90 degrees, the amount of light that is transmitted decreases from a maximum to a minimum.

For the purposes herein, the electromagnetic waves of a particular polarization, or orientation, may be separated out from the un-polarized source, which could be decomposed into a superposition of both the particular polarization and the orthogonal polarization. Devices that separate out a particular polarization are called polarizers or polarizing elements 108, 110 and may be used to obtain a beam of light generally having a single polarization, such as linearly polarized light 112.

It is commonly understood in the art that there are a number of forms of polarizers including birefringent polarizers formed by many types of crystals and also certain stretched polymers. Birefringent polarizers are formed from materials, such as calcite, whose optical refractive index is different for different polarizations of light, passing through the same location in the birefringent material. The differing optical index can be used to separate a beam of light into two beams with orthogonal polarizations. Another type of polarizer is the dichroic polarizer. A dichroic polarizer is a polarizer device that absorbs one polarization and passes the other. A common type of dichroic polarizer is a polymer sheet that has been stretched to orient its molecules and then treated with iodine and/or other materials so that the oriented molecules preferentially absorb light of one polarization orientation. An alternative polarizer technology is the use of thin-film polarizer taking advantage of Brewster's effect which notes there is a unique angle at which the light waves encountering an interface (passing from one optical medium to another) can be separated into two polarized beams, one transmitted and the other reflected. The angle at which the light strikes the interface such that this separation takes place is commonly referred to as Brewster's angle and can be easily calculated from the media properties.

It would be readily obvious to one skilled in the art that the above embodiments of differing polarizing devices could be adapted and applied to the invention herein. For the purposes herein, the polarizing elements 108, 110 or polarizers are a polarizing medium capable of receiving electromagnetic radiation such as white light 104 and a means for polarizing the radiation or light 104 into polarized radiation or polarized light 112.

In the present invention, the first and second polarizing elements 108, 110 are a polarizing medium with incident 118 and outlet 120 surfaces (these surfaces could coincide such as in a reflective device). The preferred polarizer is a polarizing film including a polarizing acetate film. Other polarizers are glass, plastics, mirrors, and polarizing coatings. Polarizers, especially polarizing films and coatings, may be affixed or coupled to other surfaces.

The number of polarizers, polarizing medium, and the size and shape selected will depend on the intended use and wavelength(s) sought to be polarized. For example, the visible spectrum is generally characterized by wavelengths, ranging between 400 to 700 nm (nanometers). A preferred embodiment of the present invention is a dimmable rearview mirror for automobiles. These are often rectangularly shaped. In this embodiment, the invention preferably would comprise a first and a second polarizing element 108, 110 able to polarize light 104 of the visible spectrum. In this preferred embodiment, the device has a reflective surface or mirror. In the preferred embodiment, the first and second polarizing elements 108, 110 are operatively coupled with a mechanical means to attenuate the white light 104. In this embodiment, the polarizers would be in the size and shape of a common rearview mirror. Preferably, the second polarizing element 110 is a polarizer and reflective surface all in one element, which, optionally may be made of safety glass or another reflective medium.

Figure 3A:
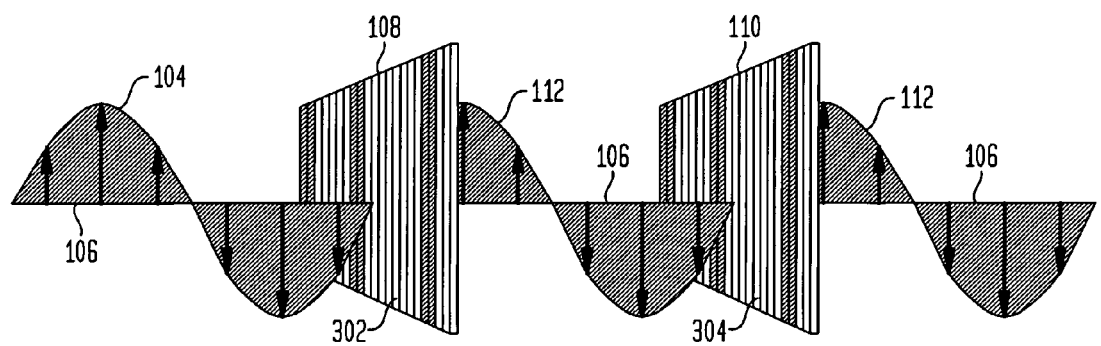
FIG. 3a is an illustrated schematic view of light passing through ordinary polarizing elements.
Figure 3B:
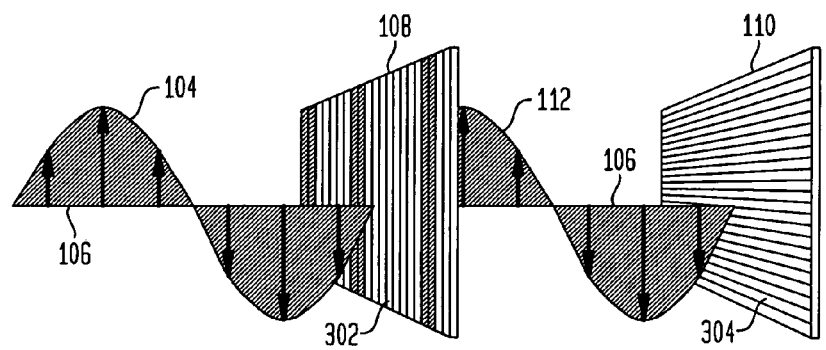
FIG. 3b is an illustrated schematic view of light passing though one ordinary polarizing element and extinguished by a second polarizing element.
Figure 3C:
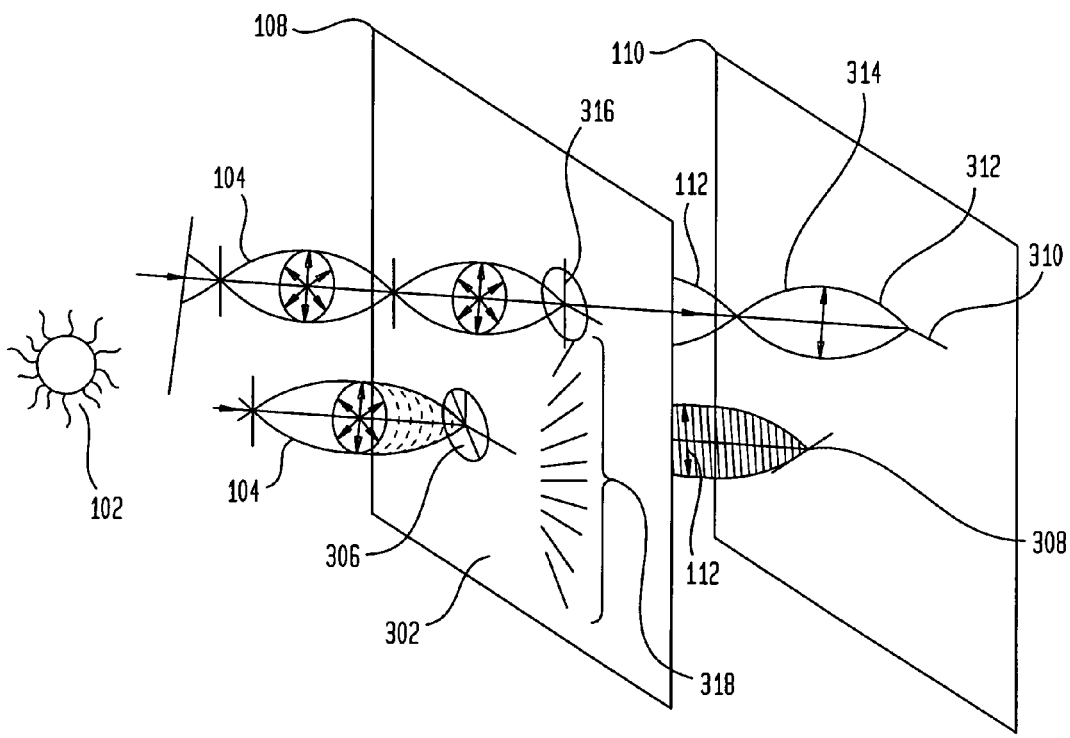
FIG. 3c is an illustrated sketch of mixed randomly polarized light passing through a pair of crossed polarizing elements further illustrating local vector polarization fields of the present invention.

As illustrated in FIGS. 3a, 3b, 3c, white light 104 is composed of electromagnetic waves. FIG. 3a illustrates an ordinary linear polarizer wherein the first and second polarizing elements 108, 110 are aligned such that light 104 with a specific angle of vibration (polarized light 112) passes through. FIG. 3b illustrates an ordinary linear polarizer wherein the first and second polarizing elements 108, 110 are set up so the polarization vector field 302 of the first polarizing element 108 and the polarization vector field 304 of the second polarizing element 110 are crossed causing the polarized light 112 from the white light 104 passing through the first polarizing element 108 to be attenuated (also referred to as extinguished or absorbed) by the second polarizing element 110.

Unlike ordinary linear polarizers illustrated in FIGS. 3a, 3b, the present invention, illustrated in FIG. 3c, accomplishes variable attenuation of white light 104 by passing through the first polarizing element 108 and the second polarizing element 110 by varying the degree of crossing the polarization vector field 302 of the first polarizing element 108 with the polarization vector field 304 of the second polarizing element 110 by mechanical means. By the same mechanical means, the polarization vector field 302 of the first polarizing element 108 can be uncrossed with the polarization vector field 304 of the second polarizing element 110 allowing polarized light 112 to pass.

The mechanical means of the present invention performs optical attenuation of light 104 by mechanically moving the first polarizing element 108 in relation to the second polarizing element 110 in a linear fashion.

As illustrated in FIG. 3c, the polarization vector field 302 of the first polarizing element 108 comprises a multitude of polarization vectors across the field 302. To aid in the description only, these are referred to as local polarization vectors. Each local polarization vector has a specific orientation of alignment such that the polarization vectors vary spatially across the polarization vector field 302.

By way of representative illustration, a local polarization vector 316 with a vertical orientation is depicted on the first polarizing element 108. Additionally depicted is a local polarization vector 306 with a −45 degree orientation. Equally important is the illustrative representation that across the polarization vector field 302 of the first polarizing element 108 are a multitude of other local polarization vectors 318 with varying orientations.

Similarly, a multitude of local polarization vectors 318 with varying orientations are on the polarization vector field 304 of the second polarizing element 110. For example, to aid in the description, a local polarization vector 310 that has a horizontal orientation is depicted on the polarization vector field 304 of the second polarizing element 110. Additionally depicted is a local polarization vector 308 with a 45 degree orientation located on the second polarizer 110.

In application, the polarization vector field 302 of the first polarizing element 108 and the polarization vector field 304 of the second polarizing element 110 each has a multitude of local polarization vectors 318 with spatially varying orientations throughout the polarization vector fields 302, 304. These are represented by local polarization vectors 318 and further discussed below in FIGS. 4,5. As can be seen in the illustration of FIG. 3c, the polarization vector field 302 of the first polarizing element 108 and the polarization vector field 304 of the second polarizing element 110 comprise local vectors 318 which are not all horizontal nor are they all vertical in orientation. Instead, the present invention comprises local vectors that vary in orientation illustrated by the local polarization vectors 318 across the polarization vector field 302 of the first polarizing element 108 and the polarization vector field 304 of the second polarizing element 110.

Illustrated in FIG. 3c, light 104 becomes polarized in one direction when it passes through the first polarizing element 108 by a local polarization vector. This is represented as local polarization vector 306 depicting the light 104 becoming a linearly polarized ray, or polarized light 112. The polarized light 112 is then attenuated by the local polarization vector 308 of the second polarizing element 110 because the local polarization vector 308 is of a different orientation compared to the local polarized vector 306 of the first polarizing element 108. In this illustration, the local polarization vector 306 and the local polarization vector 308 are crossed leading to attenuation. Thus, the present invention attenuates light.

Attenuation is depicted elsewhere in FIG. 3c. As light 104 passes through the first polarizing element 108 it becomes polarized light 112. In this representative example, it is a vertically polarized ray 314, because it passes through a local polarization vector 316 depicted with a vertical orientation. The vertically polarized ray 314 is then extinguished at 312 by the local polarization vector 310 of the second polarizing element 110. This occurs, because as is depicted in this example, the local polarization vector 310 has a horizontal vector orientation. Attenuation occurs because the local polarization vector 316 with a vertical orientation of the first polarizing element 108 and the local polarization vector 310 with a horizontal orientation of the second polarizing element 110 are crossed and light 104 is therefore attenuated. Alternatively, light 104 will pass un-attenuated, if the local polarization vectors of the first polarizing element 108 and the second polarizing element 110 are aligned.

Figure 4:
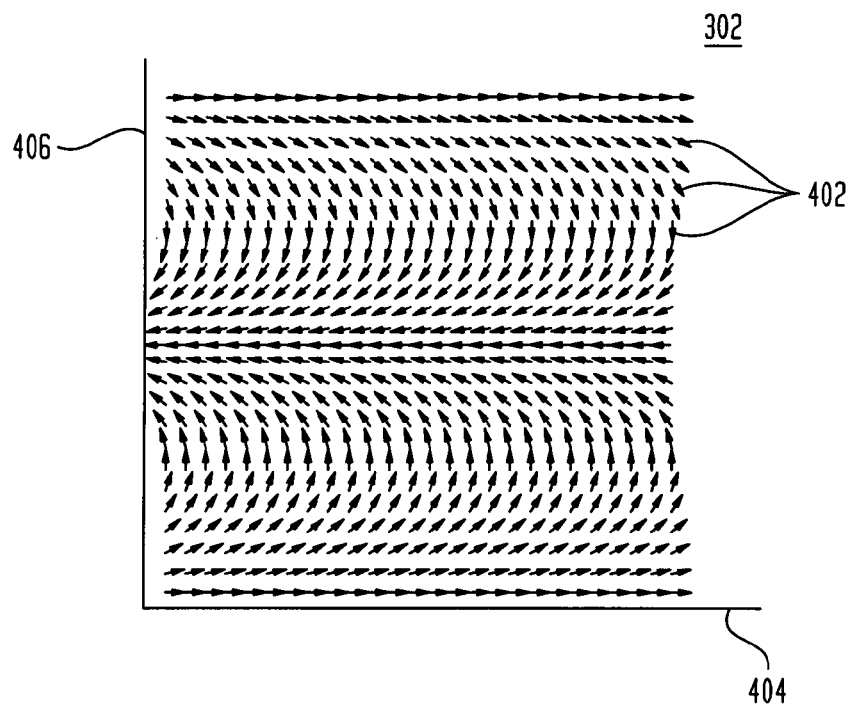
FIG. 4 is an illustration of the present invention representing a polarization vector field of a polarizing element and the orientation of polarization vectors across the field.

More specifically, FIG. 4 depicts the polarization vector field 302 of the first polarizing element 108. To aid in the description only, and as shown in FIG. 4, the polarization vector field 302 is depicted as a multitude of polarization vectors 402 (also referred to as local polarization vectors in the above discussion of FIG. 3c) across the polarization vector field 302 of the first polarizing element 108 aligned in a specific pattern. The arrangement is not drawn to scale and has been exaggerated for clarity. The field is meant to imply a continuum, the polarization vectors 402 shown are only a representative sample, in fact, the arrangement or pattern would be imperceptible to the naked eye. Although polarization vectors illustrated in FIGS. 3c, 4, 5 as discussed herein may be shown as lying in a plane, imperfections inherent in polarizing mediums, materials or construction may cause the polarizers formed by polarizing medium to be uneven.

As depicted in FIG. 4, the orientations of the polarization vectors 402 vary across the polarization vector field 302 of the first polarizing element 108 to generate the desired spatial distribution of polarization of light 104. The departure from a continuum due to physical implementation resulting in actual spacing between the polarization vectors 402 and the actual density thereof is sufficient to generate the desired polarization of light 104.

For convenience, assuming again the orthogonal coordinate system where the propagation axis 106 is perpendicular to the incident 118 and the outlet 120 surfaces of the first polarizing element 108, an x-y axis is shown where x is the horizontal component 404 and y is the vertical component 406. With reference to the polarization vector field 302 depicted in FIG. 4, the orientation of the polarization vectors 402 in an x-direction parallel to the x-axis 404 for a given y-coordinate is the same. However, the orientation of the polarization vectors 402 in a y-direction parallel to the y-axis 406 for a given x-coordinate varies. It would be readily apparent to one skilled in the art that polarization vector field 302 of the first polarizing element 108 can be inverted, rotated, translated in either orientation.

Figure 5:
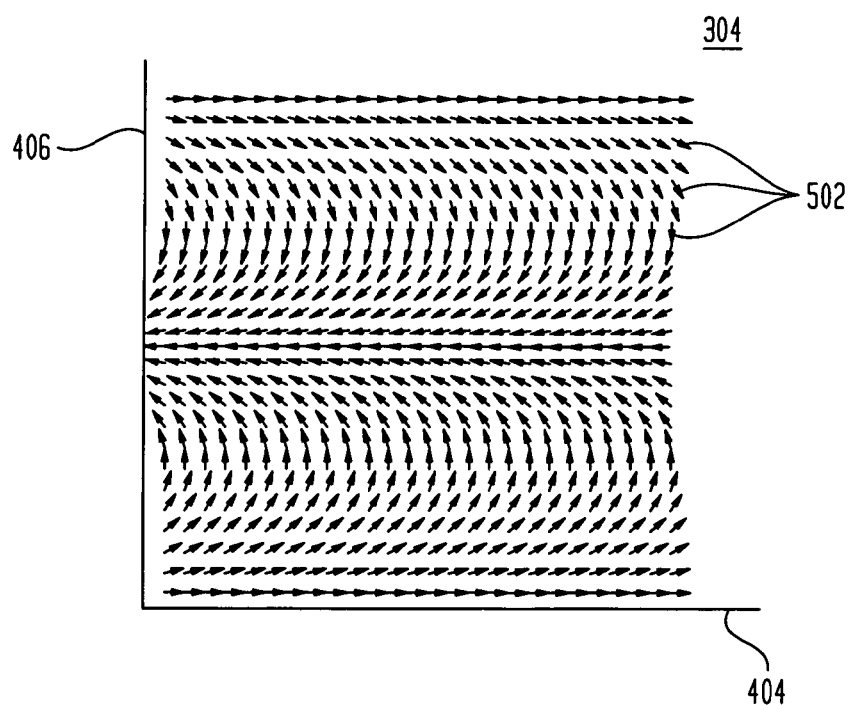
FIG. 5 is an illustration of the present invention representing a polarization vector field of a polarizing element and the orientation of polarization vectors across the field.

Similarly, FIG. 5 depicts the polarization vector field 304 of the second polarizing element 110 in the same manner as the polarization vector field 302 of the first polarizing element 108 was depicted in FIG. 5. Importantly, the orientation of the polarization vectors 502 varies across the polarization vector field 304 of the second polarizing element 110 to generate the desired spatial distribution.

Again, to aid in the description, and as shown in FIG. 5, the polarization vector field 304 of the second polarizing element 110 is depicted as a multitude of polarization vectors 502 (or local polarization vectors) across the polarization vector field 304 of the second polarizing element 110 aligned in a specific pattern. The orientations of the polarization vectors 502 vary across the polarization vector field 304 of the second polarizing element 110. From this, the invention generates the desired polarization necessary for light attenuation. The spacing between the polarization vectors 502 resulting from any physical construction and/or the density thereof is sufficient to generate the desired polarization necessary for attenuation of polarized light 112.

In one embodiment of the invention, as illustrated in FIG. 3c, a first polarizing element 108 and a second polarizing element 110 are set up in series so that the first polarizing element is capable of receiving light 104 from a light source 102. As the light 104 passes through the first polarizing element 108 it is polarized light 112. The second polarizing element 110 is capable of receiving polarized light 112. The polarized light 112 can be totally or partially attenuated as it passes through the second polarizing element 110 as depicted in FIG. 3c if the polarization vectors 502 of the second polarization vector field 304 are effectively crossed with the polarization vectors 402 of the first polarization vector field 302. In the preferred embodiment, the second polarizing element 110 is parallel to the first polarizing element 108 or skewed at no more than 30 degrees from parallel.

In the preferred embodiment, a first polarizing element 108 and a second polarizing element 110 are used in series. In order for light 104 to pass with minimum attenuation through the series of polarizing elements 108, 110, the polarization vector field 302, including the spacing, pattern, orientation and density of the polarization vectors 402, of the first polarizing element 108 is aligned with the polarization vector field 304, including the spacing, pattern, orientation and density of the polarization vectors 502, of the second polarizing element 110. In this embodiment, light 104 will pass un-attenuated, because the local polarization vectors 302,304 of the first polarizing element 108 and the second polarizing element 110 are aligned.

Alternatively, when the polarization vector field 302 of the first polarizing element 108 is crossed with the polarization vector field 304 of the second polarizing element 110, there will be attenuation of light 104. This is because of the crossing of the local vectors 402, 502. As illustrated in FIG. 3c, the polarized light 112 would suffer more than minimum attenuation by local polarization vectors 502 of the second polarizing element 110.

The present invention employs a first polarizing element 108 that is functionally similar to the second polarizing element 110 when aligned in a series. The polarization vector fields 302, 304 of the first and second polarizing elements 108, 110 are substantially identical, such that spacing, pattern, orientation and density of the polarization vectors 402 of the first polarizing element 108 are functionally equal to the spacing, pattern, orientation and density of the polarization vectors 502 of the second polarizing element 110. The present invention achieves the gradual attenuation of light 104 from minimum attenuation to maximum attenuation by mechanical misalignment of the polarization vector field 302 of the first polarizing element 108 with the polarization vector field 304 of the second polarizing element 110. This corresponds to a means for translating from uncrossed local vector fields 302, 304 depicted in FIGS. 6, 6a to crossed vector fields 302, 304 depicted in FIGS. 7,7a,7b, 8,8a,8b.

For the purpose of convenience, in FIG. 5 the vertical and horizontal components (x-y axis) are depicted again assuming the orthogonal coordinate system with the propagation axis 106 perpendicular to the incident (front) surface 118 and the outlet (back) 120 surface of the polarizing element 110 where the x- and y-axes parallel to the surfaces 118, 120 would apply. The orientation of the polarization vectors 502 in an x direction parallel to the x-axis 404 for a given y-coordinate is the same. The orientation of the polarization vectors 502 in a y direction parallel to the y-axis 406 for a given x-coordinate vary. The physical spacing between or the density of the polarization vectors 502 across the field in a x-y-direction are even across the field. It would be readily apparent to one skilled in the art that polarization vector field 304 of the second polarizing element 110 can be inverted, rotated or translated in either field.

As shown in FIGS. 4, 5, in the present embodiment, the polarization vectors 402 of the polarization vector field 302 of the first polarizing element 108 and the polarization vectors 502 of the polarization vector field 304 of the second polarizing element 110 are oriented such that polarization vectors 402, 502 across the vector fields 302, 304 of the polarizing elements 108, 110 have a specific alignment. This is conveniently depicted for the purposes herein in FIGS. 4, 5. In the preferred embodiment, the continuously varying specific orientation of the vectors is more accurately defined by the mathematical expression wherein the polarization vectors 402, 502 across the vector fields 302, 304 of the first and second polarizing elements 108,110 vary according to the vertical (y) component 406 as given in (1).

$$f(x,y)=\{(\cos(\omega \cdot y), \sin(\omega \cdot y)\} \quad (1)$$

With regards to (1), ω defines the spatial frequency of the sinusoidal variations of the vector field in the y-direction. The spatial frequency can be chosen to give a desired translation distance to go from two vector fields being aligned to being totally crossed.

Thus, FIG. 4 is the polarization vector field 302 described by (1) plotted over a full period of the sinusoids of (1), of the first polarizing element 108.

And, FIG. 5 is the polarization vector field 304 described by (1) plotted over a full period of the sinusoid for the second polarizing element 110.

In an implementation many more periods would be preferred to keep the translation distance to go from aligned vector fields to crossed vector fields small and the polarizers' overlap large. Additionally, it would be obvious to one skilled in the art that the vector described by (1) can be translated as either a function of varying x, or as a function of varying y. It would also be obvious to one skilled in the art that vectors other than the one defined by (1) can be created and used in the present invention.

Figure 6:
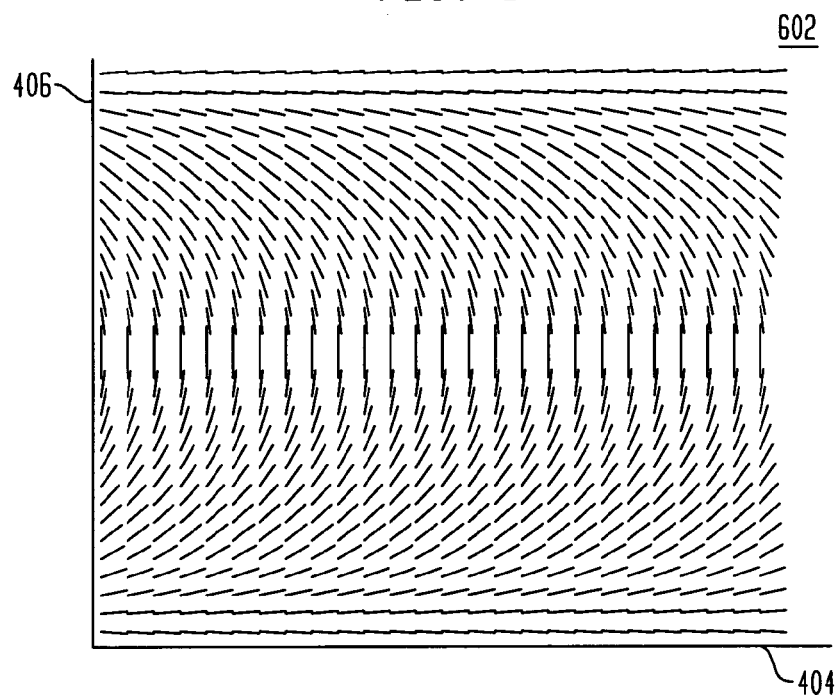
FIG. 6 is a depiction of two superimposed overlaid polarization vector fields with perfectly aligned polarization vectors.
Figure 6A:
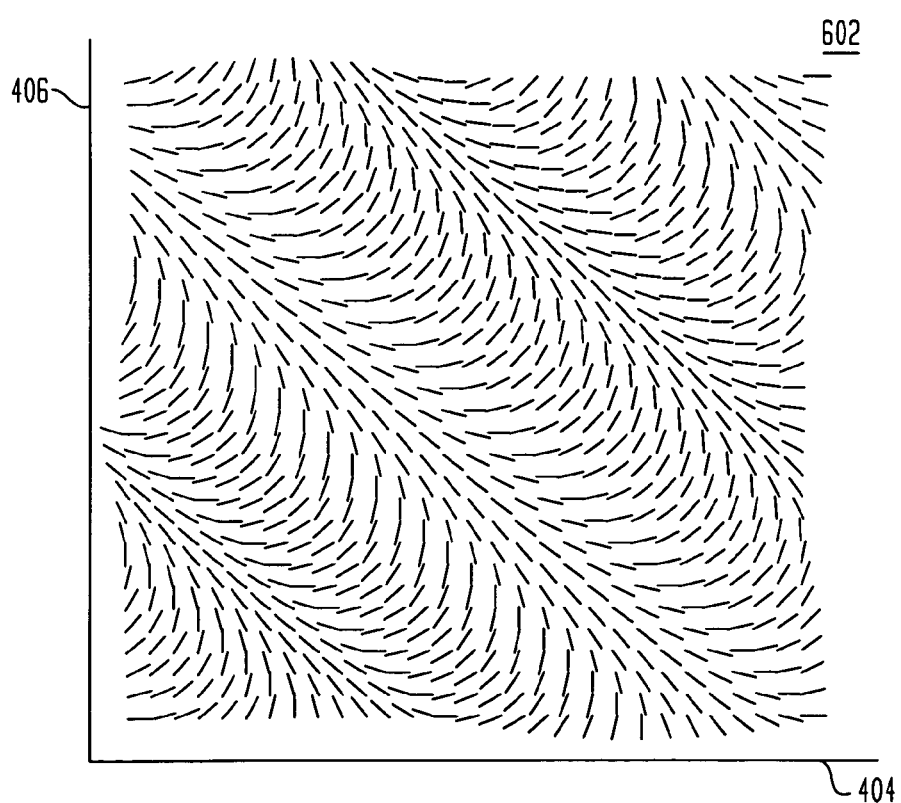
FIG. 6a is a further depiction of two superimposed overlaid polarization vector fields with perfectly aligned polarization vectors.

In the present embodiment of the first polarizing element 108 and the second polarizing element 110 in series, when the polarization vectors 402 of the polarization vector field 302 of the first polarizing element 108 are aligned with the polarization vectors 502 of the polarization vector field 304 of the second polarizing element 110 such that the vectors 402, 502 are uncrossed (aligned) as depicted in the representation of FIG. 6, polarized light 112 passes through. This would correspond to the first and second polarizing elements 108, 110 being positioned to let the maximum amount of light to be transmitted through both polarizing elements 108, 110. To aid in the description, two superimposed overlaid vector fields aligned (uncrossed polarization vectors) 602 are graphically depicted, wherein the two fields represented are the polarization vector fields 302, 304 of the first and second polarizing element 108, 110. It would be readily apparent to one skilled in the art that polarization vector fields 302, 304 are not limited to the alignment depicted in FIG. 6 for the transmission of light 112. If the polarization vector fields 302, 304 are inverted, rotated or translated while in series and when aligned, an alternate embodiment is depicted in FIG. 6a. FIG. 6a represents an alternate depiction of two polarization vector fields aligned as if superimposed when the polarizing elements 108, 110 are in series but where the polarization vector fields 302, 304 are rotated.

Figure 7B:
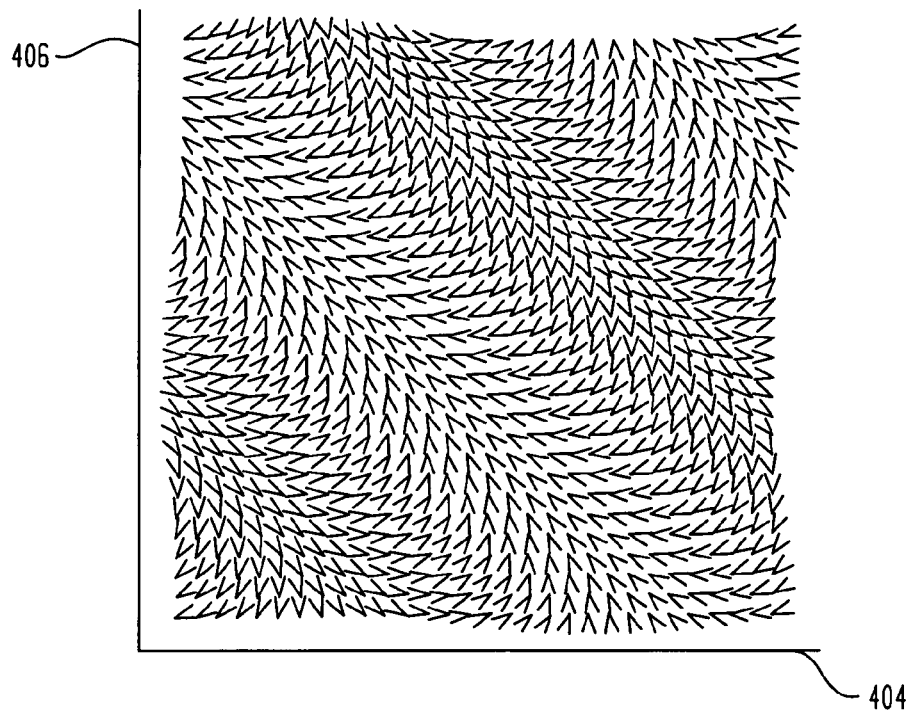
FIG. 7b is further depiction of two superimposed overlaid polarization vector fields with partially crossed polarization vectors rotated.
Figure 7:
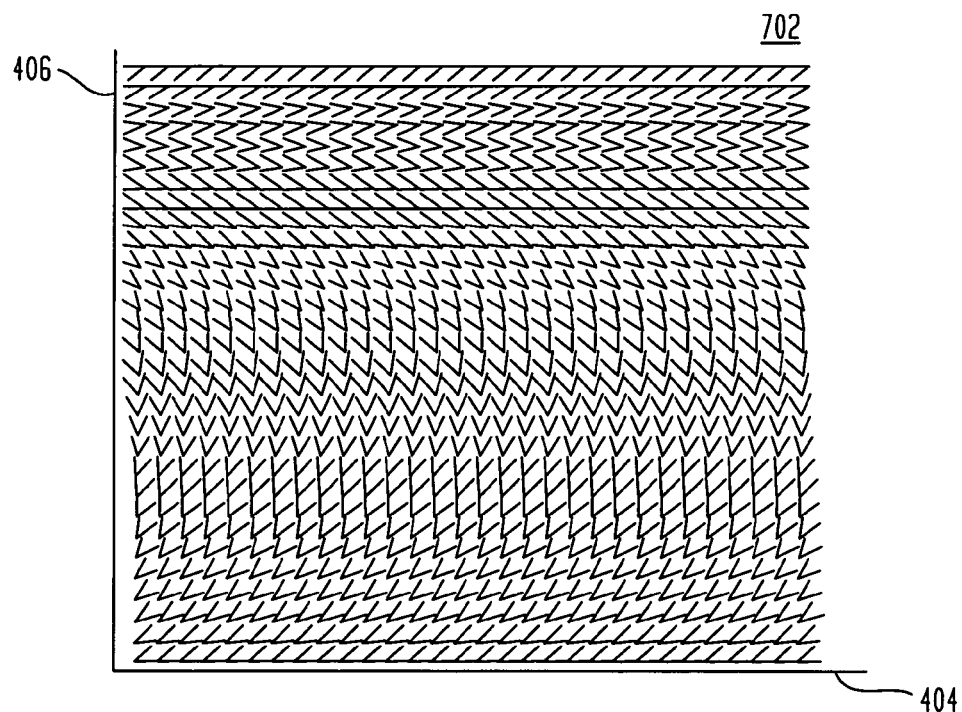
FIG. 7 is a depiction of two superimposed overlaid polarization vector fields with partially crossed polarization vectors.
Figure 7A:
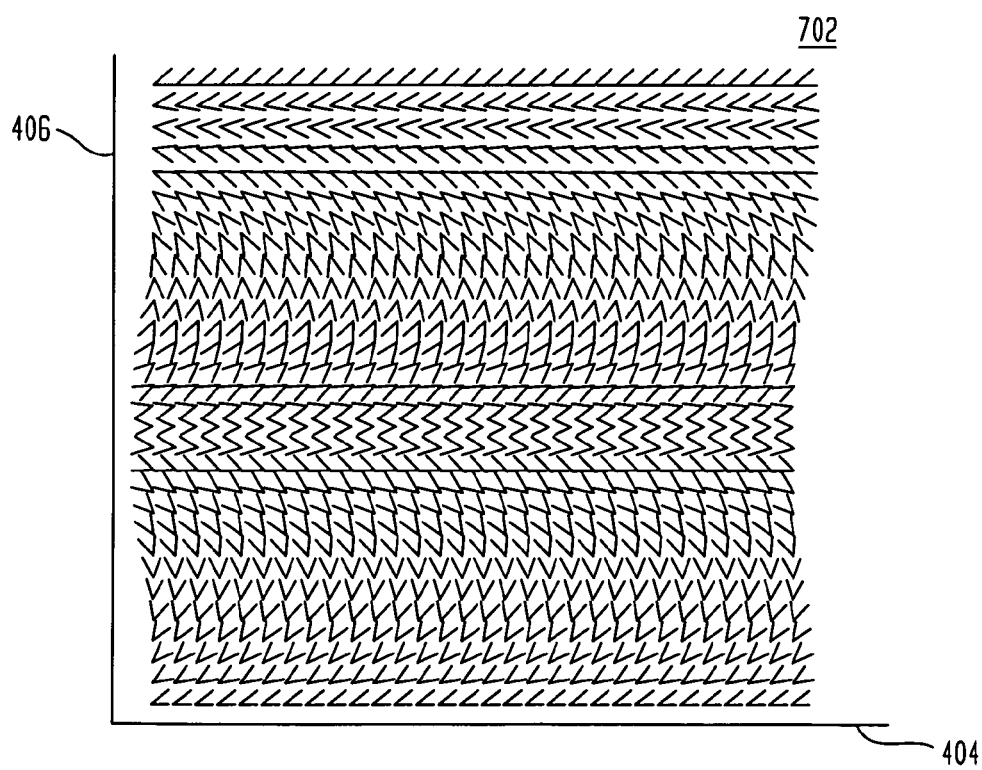
FIG. 7a is a further depiction of two superimposed overlaid polarization vector fields with partially crossed polarization vectors.

In the present embodiment of the first polarizing element 108 and the second polarizing element 110 in series, when the polarization vectors 402 of the polarization vector field 302 of the first polarizing element 108 are misaligned with the polarization vectors 502 of the polarization vector field 304 of the second polarizing element 110 such that the vectors 402, 502 are crossed (misaligned), polarized light 112 suffers attenuation through the second polarizing element 110. To aid in the description, FIG. 7 and FIG. 7a depict two superimposed overlaid vector fields displaced in the vertical y component 406 by $\pi/(4\omega)$ or 45 degrees creating a partially crossed polarization vector field representation (partially crossed polarization vectors) 702, wherein the two polarization vector fields represented are the polarization vector fields 302, 304 of the first and second polarizing element 108, 110. FIGS. 7 and 7a illustrate the displacement that creates the same relative angle of $\pi/4$ or 45 degrees between the polarization vectors 402, 502 over the entire area of the polarization vector fields 302, 304 of the first and second polarizing element 108, 110 using strictly linear translation as opposed to a rotation or circular rotation. When the first and second polarizing elements 108, 110 are aligned so that the polarized vectors 402, 502 are partially crossed as illustrated in FIGS. 7 and 7a, light will be partially attenuated. FIGS. 7 and 7a further depict the fact that the first and second polarizing elements 108, 110 would be effectively crossed at a 45 degree angle everywhere across the vector field. FIG. 7b represents partial crossing of the polarized vectors 402, 502 similarly as FIGS. 7 and 7a but in the depiction of FIG. 7b, the vector fields 402, 502 are rotated (transformed) to a different orientation.

Figure 8A:
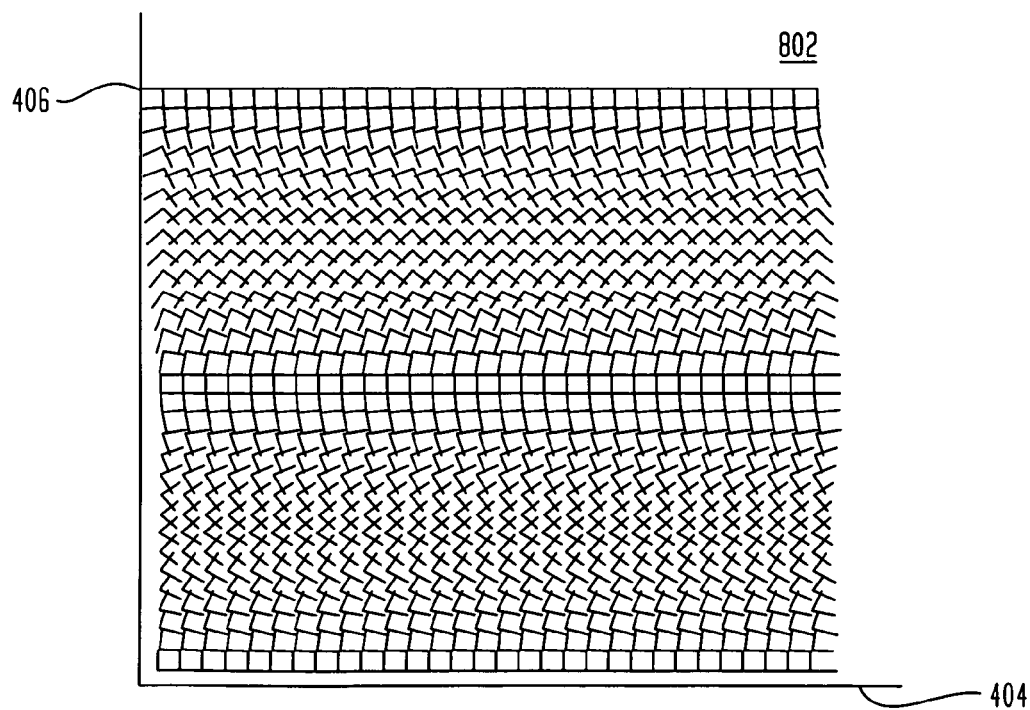
FIG. 8a is a further depiction of two superimposed overlaid polarization vector fields with totally crossed polarization vectors.
Figure 8B:
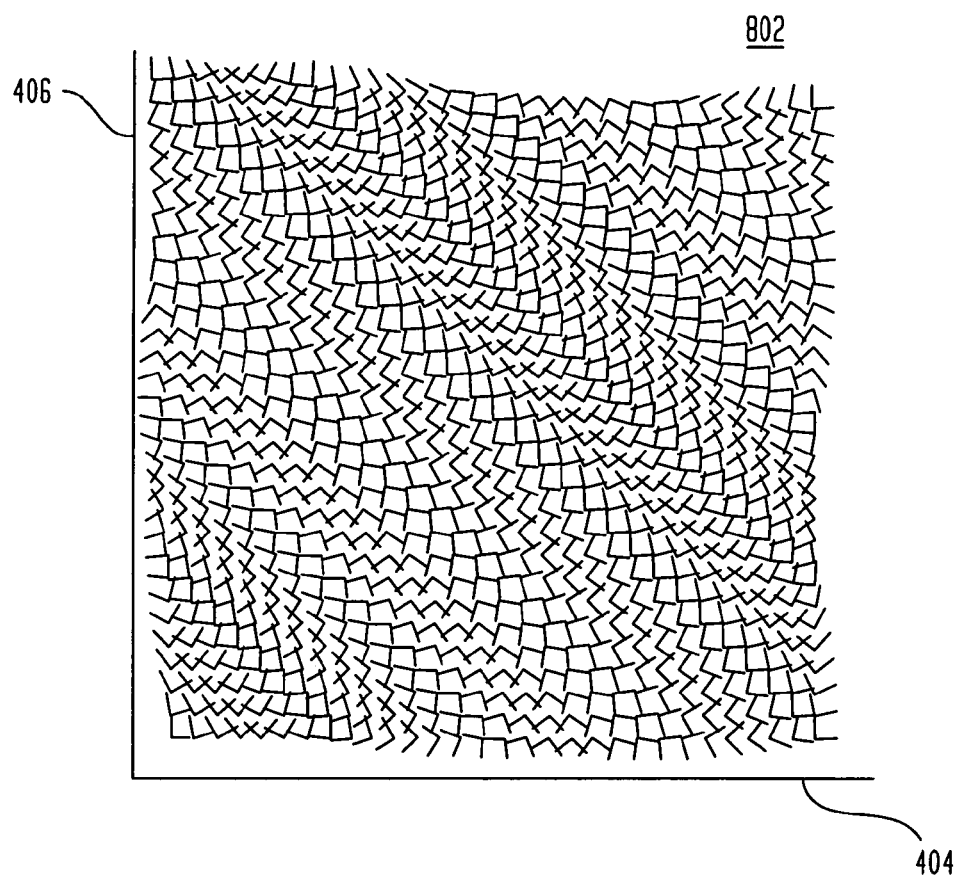
FIG. 8b is a further depiction of two superimposed overlaid polarization vector fields with totally crossed polarization vectors rotated.

FIGS. 8a and 8b further depict two superimposed overlaid vector fields displaced in the vertical component y axis 406 by π/(2ω), or 90 degrees, or for that matter any integer multiple thereof, creating a crossed polarization vector field 802 representation of maximum attenuation of polarized light 112, wherein, again, the two polarization vector fields represented are the polarization vector fields 302, 304 of the first and second polarizing element 108, 110. FIG. 8a depicts the same relative angle of 90 degrees between all the polarization vectors 402, 502 over the entire area of the polarization vector fields 302, 304 of the first and second polarizing element 108, 110 using strictly linear translation. FIG. 8b represents maximum crossing of the polarized vectors 402, 502 similarly as FIG. 8a but in the depiction of FIG. 8b, the vector fields 402, 502 are rotated (transformed) to a different orientation.

Translations beyond the maximum attenuation will result in the two superimposed overlaid polarization vector fields 302, 304 passing more light again through both polarizing elements 108, 110. In application of the present invention, translation (movement) of the first polarizing element 108 with respect to the second polarizing element 110 is a uniform movement without circular rotation, by mechanical means. In the preferred embodiment, the invention comprises means for vertical translation (movement in the y-direction 406), by mechanical means, of the first polarizing element 108 with respect to the second polarizing element 110. The vertical translation results in a displacement of the polarization vector field 302 of the first polarizing element 108 in relation to the polarization vector field 304 of the second polarizing element 110 as illustrated in FIGS. 7, 7a, 8, 8a by a magnitude of y but the direction of each polarization vector 402 across the field 302 of the first polarizing element 108 remains the same. In this present embodiment, the smallest magnitude of vertical translation that is required to achieve maximum attenuation can be set by choosing ω, as ω defines the relation between rotation of the polarization vectors with respect to translation in the y-direction 406. A larger value for co, the spatial angular frequency, will require a shorter translation in the y-direction 406 to go from minimum attenuation to maximum attenuation. This minimum distance can be set to practically any amount within the resolution capabilities of the polarizing elements 108, 110. Alternatively, vertical translation can be traded for resolution in selecting line density on the polarizing elements 108, 110. In the preferred embodiment of the dimmable mirror, the translation distance would be on the order of several millimeters, and the distance between the polarization vectors (or density), could be on a microscopic scale approximating a continuum and is dictated by the manufacturing process. Also, polarizing element thickness is mainly dictated by the substrate (polarizing medium) and could be as thin as acetate film or as thick as a practical piece of glass.

In the present embodiment, vertical translation (movement) along the y-axis 406 of the first polarizing element 108 with respect to the second polarizing element 110 in a magnitude (distance) that creates the same relative angle of say π/4 or 45 degrees between all the polarization vectors 402, 502 of the polarization vectors fields 302, 304, of the first and second polarizing element 108, 110 over the entire area of the vectors fields 302, 304 as depicted in FIGS. 7, 7a attenuates the polarized light 112 passing through the second polarizing element 110. Similarly, vertical translation along the y-axis 406 of the first polarizing element 108 with respect to the second polarizing element 110 in a magnitude (distance) that creates the same relative angle y=π/(2ω) or any integer multiple thereof, which can also be expressed in degrees as 90 degrees, as depicted in FIGS. 8a, 8b results in maximum attenuation of polarized light 112. Translations beyond the maximum attenuation will result in the second polarizing element 110 passing more light again.

In application, the polarization vectors 402 of the polarization vector field 302 of the first polarizing element 108 and the polarization vectors 502 on the polarization vector field 304 of the second polarizing element 110 are capable of being aligned (uncrossed) as depicted by uncrossed polarization vectors 602.

In application, the amount of polarized light 112 that passes through the second polarizing element 110 is attenuated by vertical translation of the first polarizing element 108 with respect to the second polarizing element 110. This is easily accomplished by a dimming mechanism including means for gradually sliding the first polarizing element 108 up or down (vertically) with respect to the second polarizing element 110 by any means, including a user grabbing a handle affixed to the first polarizing element 108 and physically moving the first polarizing element 108, or by any mechanized means such as pneumatic operation, all of which would be obvious to one skilled in the art. The control over a dimming mechanism may alternatively be by means of a rotating knob which would allow for precise setting of the attenuation level even while in motion. A simple handle is generally preferred for on/off dimming mirrors particularly in a mobile application traveling over rough roads. In an alternative embodiment, a motor with a gear system would provide precision control over the alignment of the linear movement (vertical translation) resulting in controlled and gradual attenuation of light passing through the polarizing elements 108, 110, wherein, optionally, the control could be achieved through a sensor actuator feedback loop.

Figure 9:
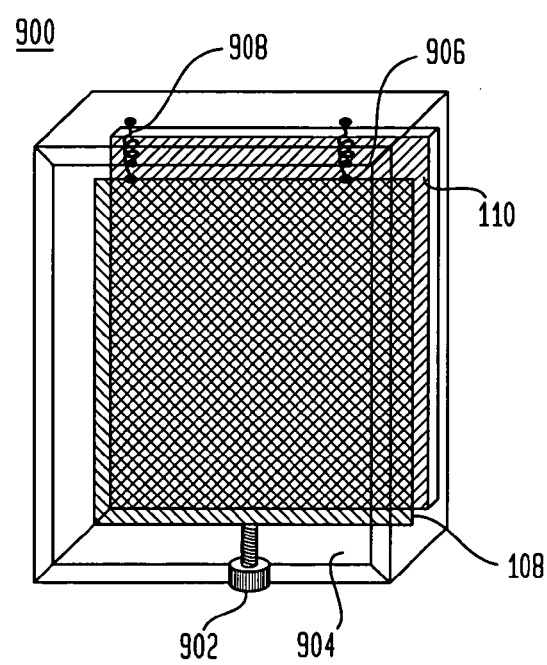
FIG. 9a is a schematic view of a dimmable mirror apparatus.

FIG. 9 is a functional sketch of a dimmable mirror device 900 implementation of the present invention and is a preferred embodiment and use of the present invention. It comprises a side view mirror housing 906 with protective glass 904. This embodiment further comprises a threaded thumb screw 902 operatively connected to a first polarizing element 108 and tensioning springs 908 for height adjustment of a first polarizing element 108 with respect to a second polarizing element 110. In this embodiment, the second polarizing element 110 is a reflective polarizer or a mirror/polarizer combination, preferably in a single element. The tensioning springs 908 may also be supplemented with dampers to prevent vibration of the first polarizing element 108, and the thumb screw 902 could be remotely located through the use of a flexible shaft operatively coupled. It would be obvious to one skilled in the art to use alternative mechanical means other than a thumb screw 902 and tensioning spring 908 combination, including how to operatively couple the mechanical means for use.

Additionally, in this embodiment, a user, using the thumb screw 902 connected to the first polarizing element 108, moves the first polarizing element 108 up and down, gradually attenuating light, where light passes through the two polarizing elements 108, 110 wherein the second polarizing element 110 is a reflective polarizer or mirror/polarizing element combination and light reflects off it, returning through the first polarizing element 108 to a user's view. Attenuation of the amount of light that returns to the user's eye is a result of the alignment of the polarization vector 402 on the polarization vector field 302 of the first polarizing 108 and the polarization vector 502 on the polarization vector field 304 of the second polarizing element 110. When the polarization vector fields 302, 304 are crossed (misaligned)

such as that depicted in FIGS. 7, 7a,7b, 8, 8a,8b the polarized light 112 from the first polarizer 108 is extinguished by the second polarizing element 110 as illustrated in FIG. 3c. As the user vertically translates the first polarizing element 108 with respect to the second polarizing element 110, the polarization vector fields 302, 304 are displaced from an uncrossed, to crossed, back to uncrossed, alignments (e.g. corresponding to a rotation from 0 to 90 to 180 degrees) depicted in FIGS. 6,7, 7a, 8, 8a. The amount of polarized light 112 that passes gradually reaches a maximum attenuation at 90 degrees and returns to a minimum attenuation at 180 degrees. With reference to FIG. 9, in the preferred embodiment for use as a dimmable mirror device 900 found in automobiles, the second polarizing element 110 can comprise a reflective surface or be affixed to a reflective surface. Preferably, the second polarizing element 110 is a polarizer and reflective surface all in one element. The mechanical means in this embodiment can also comprise the user using a handle connected to the first polarizing element 108 or by some other mechanical means such as mechanized motor system connected to a gear box or by means of a rotating knob.

In the preferred embodiment, the first polarizing element 108 is not separated by more than ¼ inch distance from the second polarizing element 110 to avoid restrictions on the field of view at oblique angles. The first polarizing element 108 and the second polarizing element 110 may be in direct contact with or superimposed and overlaid upon each other; however, to avoid scratching of the surfaces 118, 120 of the first and second polarizing elements 108, 110 it is preferred to have some distance between the two, but it is preferred to keep this distance small.

In the preferred embodiment, the first and second polarizing elements 108, 110 are solid or affixed to a solid medium or consist of a flexible film or sheet like material. If the first and second polarizing elements 108, 110 are fluid like, the present invention cannot consistently orient the polarization vectors 402, 502. In the preferred embodiment of the invention, the first and second polarizing elements are substantially flat with parallel incident (front) 118 and outlet (back) surfaces 120.

Alternate embodiments include curved, concave or convex first and second polarizing elements 108, 110 comprising incident (front) 118 and outlet (back) surfaces 120 that are curved, concave or convex. In these embodiments, the vector field 302 of the first polarizing element 108 and the polarization vector field 304 of the second polarizing element 110 compensate for the curve by means permitting the alignment and gradual mis-alignment of the vectors fields 302, 304 when the first and second polarizing elements 108, 110 are in series to attenuate light. Preferably, in an application requiring dimmable concave mirrors, the first and second polarizing elements 108, 110 are curved.

Alternate embodiments of the present invention is in the personal products field for the manual control dimming in eye glasses and goggles. Such control is not currently available in the existing products which are based on photochromic principles which also suffer undesirable color changes. Additionally, when a user experiences sudden bright light flashes as may occur in welding or high intensity lighting operation, the user may mechanically attenuate the light by using the present invention herein by mechanically translating polarizing elements for optical attenuation. It is understood that manual control of the dimming function can be supplemented with light sensors and controls to automatically attenuate light levels in those applications where warranted.

An additional embodiment of the present invention is in buildings, such as homes, stores, offices and schools, wherein uses of the present invention are to control sunlight and thermal regulation, resulting in significant cost savings in both construction and maintenance. The installation of the present invention comprising polarizing elements capable of non-circular mechanical variable optical attenuation between the panes of insulated glass eliminates the need for curtains, drapes, blinds or other devices located inside the structure. Control of the dimming function is by mechanical means such as manual operation and/or an automatic motorized system as would be evident to one skilled in the art. In this embodiment, mechanical control could also use a remote control device such as those used in television sets. In the alternative applications described herein the evacuated space between the panes may be backfilled with inert gas such as argon to further reduce heat loss or gain. Operating in this non-oxidative atmosphere further increases the satisfactory operating life of the present invention and is preferred. In the case of operating windows, the elimination of the drapes, curtains or blinds optimizes ventilation efficiency of the window. Alternatively, the space between panes is kept evacuated. Alternatively the polarizers could form a curtain or shade like device that does not need to reside between the glass panes.

A further embodiment of the present invention is in skylights again using the polarizing elements with non-circular mechanical means to attenuate light as described for insulated glass including dimming controls based on manual or automatic control or both with remote controls where necessary. This embodiment again eliminates the need for any inside light control accessory such as the above mentioned drapes, curtains or blinds which, due to the typically sloped or flat roof installation of a skylight, makes installation and operation of such accessories difficult. The ventilation efficiency of operating skylights is maximized with the present invention by the elimination of a light control accessory located on the inside (room side) of the skylight.

A further alternative embodiment of the present invention would be for use in commercial buildings, offices and facilities where rapid floor plan reconfiguration is required. Windowalls with polarizing elements can provide a virtually instant transformation from individual single occupant offices to a visually larger open work-space. Similarly, a further embodiment of the present invention would be in applications requiring privacy and/or security. Storefront windows and doors can be dimmed to prevent viewing of store contents at the close of business hours or later automatically at the proprietor's choice. In banks, teller areas are currently built with clear, bullet-proof glass or plastic for security. Incorporation of the present invention in the teller's area would further enhance security by instantaneous dimming when threatening situations are developing.

In these embodiments, the polarizing elements 108, 110 can either be reflective polarizers, or mirror/polarizing element combinations, transmissive polarizers or polarizing elements, or any combination of transmissive and reflective polarizers and polarizing elements.

For the purposes of convenience only, this invention is generally described with respect to linear, vertical translation, or movement along the y-axis 406, of the first polarizing element 108 with respect to the second polarizing element 110. It would be readily apparent to one skilled in the art that the invention is applicable to moving the second polarizing element 110 with respect to the first polarizing element 108 and that horizontal translation, or movement along the x-axis 404, or movement in any non-circular or elliptical manner not just linearly, would all be within the scope of the invention. It would further be readily apparent to one skilled in the art that the scope of this invention applies to one or more polarizing elements and it is for convenience purposes only that the discussion has referred to a first and second polarizing element 108, 110. In the present invention, optical attenuation of the white light 104 is achieved because the invention comprises mechanical means whereby the first polarizing element 108 is translated non-circularly with respect to the second polarizing 110, whereby the non-circular translation of the first polarizing element 108 with respect to the second polarizing element 110 mis-aligns the polarization vectors 402 of the first polarizing element 108 with respect to the polarization vectors 502 of the second polarizing element 110 crossing the vectors 402, 502 by the same amount on all overlapping locations of the polarizing elements 108, 110.

As already discussed, and known to one skilled in the art, white light 104 comprises electromagnetic radiation and its electrical vectors can therefore be split into two perpendicular components. For the purposes herein, the progression of the wave of light or electromagnetic radiation passing through the polarizing elements 108, 110 follows a propagation (z) axis 106 and can be polarized and this invention applies to other forms of electromagnetic radiation not just visible light as is described herein. It is commonly known by convention that the x-y coordinates are therefore perpendicular to the z axis and that varying y will refer to vertical linear translation of that coordinate. Varying and gradual attenuation of light occurs as the polarizing elements 108, 110 are used as described herein by the vertical translation of one polarizing element 108 with respect to the other polarizing element 110.

Manufacture of polarizing elements 108, 110 comprising polarization vectors 402, 502 varying across the vector fields 302, 304 and aligned in a specific pattern as that illustrated in FIGS. 4,5 as more defined in the mathematical equation given in (1), can be accomplished with appropriate modifications to the traditional methods of manufacture of polarizing elements. Embodiments of methods of manufacture include the alignment of finely ground, bifringent or dichroic crystals using magnetic or electric fields. In that embodiment of manufacture, an appropriately shaped electric or magnetic orienting field is used to align the crystals in a viscous medium to give the desired polarization vector fields 302, 304. The medium is then allowed to solidify and harden. In order to achieve the desired patterns depicted in FIGS. 4,5 a linearly oriented magnetic or electric field is used in the following manner. The polarizing material is then moved through the narrow line field as the orientation of the field is rotated with respect to the position of the polarizing material. Only the section of the material in the field would be allowed to reorient itself by responding to the field. This could be accomplished through selectively liquefying, sensitizing or making malleable only the portion of the material currently exposed to the field. This exposing region is then swept across the polarizing material as the orientation of the field rotates with respect to position of the polarizing material.

As an alternative to an alignment method of stretching a viscous suspension of crystals, a substrate could be prepared with microscopic grooves in the desired pattern, and crystal particles could align themselves preferentially along the grooves. As an alternative to crystals, conductive polymer chains or tiny metal thread-like particles (e.g. needles of tellurium) could be used. In this embodiment of manufacture, the metal particles are of a length about the same order as the wavelengths of the light to be polarized. Additionally, in order to get a polarizer that functions for a variety of wavelengths, different length conductive particles can be mixed. Creating properly aligned particles could also be achieved through selective removal, such as etching, ion beam etching, or laser ablating, of a homogeneous coating of a material such as thin metal layer. The resultant polarization vector field 302, 304 pattern would be similar to the images of FIGS. 4,5. Naturally, the particles would be much smaller and the different lengths of particles are used in order to create an achromatic polarizing effect.

Figure 10:
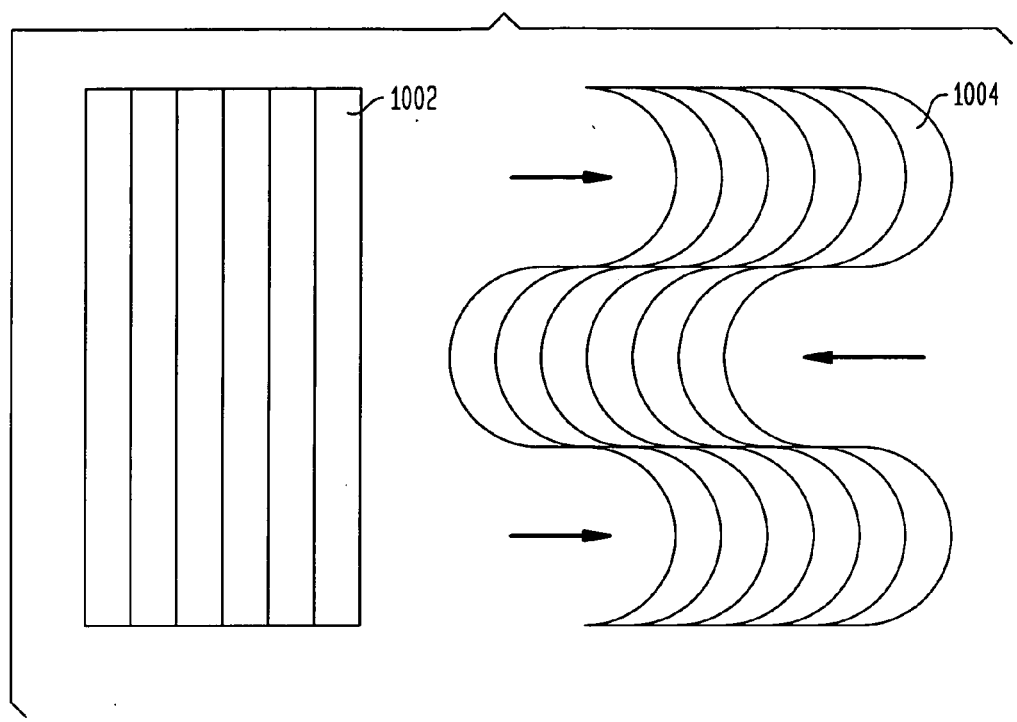
FIG. 10 illustrates the reshaping of a pliable linear polarizer into a desired vector field.

Additionally, rather than simply stretching the materials to align all the particles, a new deformation will need to be derived to align the particle as desired. As illustrated in FIG. 10 for a pattern similar to the one shown in FIGS. 4,5 pulling alternatively to one side and the other may accomplish that task or a linear polarizer could be made malleable again, possibly through warming, or by other means, and the linear polarizer could be carefully reshaped. FIG. 10 depicts the reshaping of a pliable linear polarizer 1002 into a desired vector field 1004.

An alternate embodiment of manufacture employing commonly known technology in making polarizing elements is aligning liquid crystal molecules through photo-alignment. This method exposes a film to linearly polarized light to achieve anisotropic pattern in the chemicals of the film such as cross-linking of the molecular chains. A preferred embodiment of the film is a variation of Poly-Vinyl-Cinnamate (PVCi) film. When used with liquid crystals, these then attach to the sites and are chemically aligned with the pattern (e.g. anisotropic Van der Waals interaction). In the case of the non-liquid crystal polarizer, iodine and/or other chemical compounds could be attached to create the desired polarizing element.

Figure 11:
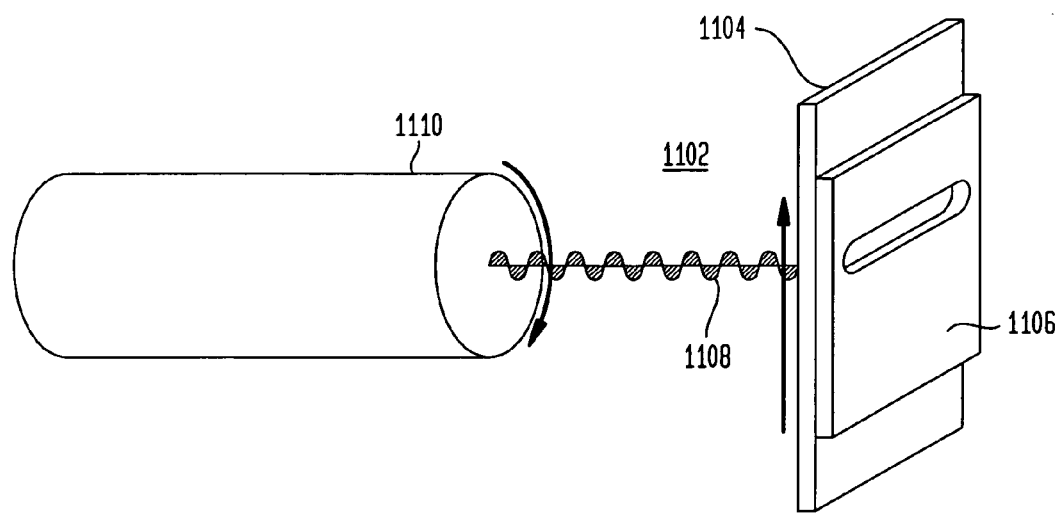
FIG. 11 is a schematic diagram of an exposure apparatus for creating vector field orientation on optically sensitive material.

In an alternate embodiment of manufacture, a similar opto-chemical method is used to create the desired polarization vector field. A fixed, solid polarizer with the desired pattern is made by using a material or film (possibly matrix film used to make Vectographs) or other optically sensitive material, that is photographically exposed to polarized light 112 in order to record/create the desired pattern of the polarization vectors fields 302, 304. Instead of attaching liquid crystal molecules, another chemical process could be used (attaching iodine or other appropriate conductive compounds) to make the desired pattern anisotropically conductive and thereby a polarizing element 108, 110. In order to obtain the polarization vector field 302, 304 illustrated in FIGS. 4,5 a previously made polarizer with the appropriate pattern of the desired orientations could be used as a mask. Referring to FIG. 11, the original could be created by using a very thin slit 1102 on a sliding mask 1104 that is slowly moved across the unexposed optically sensitive material 1106 (e.g. matrix film) while it is exposed through the slit to linearly polarized light 1108 whose axis of polarization is rotating with the translation of the slit 1102. The light source could be a linearly polarized ultraviolet (UV) laser 1110 that is rotated as the slit 1102 is translated similar to what is shown in FIG. 11.

Other alternative methods of manufacture could be based on holographic methods, where the polarizing elements 108, 110 are holograms that transmit or reflect the desired polarizations. The hologram could be polychromatic in order to work with different light wavelengths. For example, in the embodiment of a dimmable rearview mirror, one hologram is reflective and functions as the reflective mirror surface, whereas the other is a transmissive polarizing element that may or may not also be manufactured using holographic techniques. The reflective hologram could consist of a laser etched or electron beam etched reflective surface. The two resultant polarizing elements would be aligned and moved with respect to the other in order to achieve attenuation in the manner already discussed.

While various embodiments of the present invention have been described, it should be understood that they have been presented by way of example only, and not limitation. It will be understood by those skilled in the art that various changes in form and details may be made therein without departing from the spirit and scope of the invention. Thus, the breadth and scope of the present invention should not be limited by any of the above-described exemplary embodiments, but should be defined in accordance with the described terms and equivalents.

What is claimed is:

1. An optical attenuator for attenuating light, comprising:
    a first polarizing element having a first polarization vector field that varies spatially across said first polarizing element;
    a second polarizing element having a second polarization vector field that varies spatially across said second polarizing element, wherein said first polarizing element and said second polarizing element are aligned in series, separated by a pre-defined distance, wherein said second polarization vector field is adapted to being in alignment with said first polarization vector field; and
    a mechanical means for attenuating light passing through said first polarizing element and said second polarizing element, wherein said mechanical means gradually translates said first polarizing element in relation to said second polarizing element such that said first polarization vector field is not in alignment with said second polarization vector field.

2. The optical attenuator of claim 1, wherein said first polarizing element comprises:
    a first incident surface adapted to receive light from a light source and having a means for allowing light with a pre-defined polarization to pass through, said pre-defined polarization aligns with said first polarization vector field, thereby generating first polarized light; and
    a first outlet surface parallel to said first incident surface for said first polarized light to exit said first polarizing element.

3. The optical attenuator of claim 2, wherein said second polarizing element comprises:
    a second incident surface adapted to receive said first polarized light; and
    a second outlet surface parallel to said second incident surface,
    wherein both said second incident surface and said second outlet surface of said second polarizing element are substantially parallel to said first incident surface and said first outlet surface of said first polarizing element.

4. The optical attenuator of claim 2, wherein said first polarized light is attenuated by said second polarizing element when said first polarization vector field is crossed at a relative angle of 90 degrees with said second polarization vector field by said mechanical means.

5. The optical attenuator of claim 1, wherein said first polarization vector field and said second polarization vector field comprise polarization vectors defined by the mathematical expression of $\vec{f}(x,y)=(\cos(\omega \cdot y),\sin(\omega \cdot y))$.

6. The optical attenuator of claim 1, wherein said first polarizing element and said second polarizing element are of a medium selected from a group consisting of glass and plastic.

7. The optical attenuator of claim 1, wherein said second polarizing element is a reflective medium.

8. The optical attenuator of claim 1, wherein said first polarizing element and said second polarizing element are polarized acetate film capable of being affixed to a solid surface.

9. The optical attenuator of claim 1, wherein said pre-defined distance is about ¼ inch or less.

10. The optical attenuator of claim 1, wherein said mechanical means for attenuating light is in communication with said first polarizing element and is selected from the group consisting of: a motor and a gear box, a handle, and a threaded thumb screw operatively connected to one or more tensioning springs.

11. The optical attenuator of claim 1, wherein said first polarizing element and said second polarizing element are curved such that a curvature of said first polarizing element is equal to a curvature of said second polarizing element.

12. The optical attenuator of claim 1, wherein said first polarization vector field and said second polarization vector field vary along a vertical axis.

13. An optical attenuator for attenuating electromagnetic radiation, comprising:
    a first polarizing element having a first polarization vector field that varies spatially across said first polarizing element;
    a second polarizing element having a second polarization vector field that varies spatially across said second polarizing element, wherein said first polarizing element and said second polarizing element are aligned in series, separated by a pre-defined distance, wherein said second polarization vector field is adapted to being in alignment with said first polarization vector field; and
    a mechanical means for attenuating electromagnetic radiation passing through said first polarizing element and said second polarizing element, wherein said mechanical means gradually translates said first polarizing element in relation to said second polarizing element such that said first polarization vector field is not in alignment with said second polarization vector field.

14. The optical attenuator of claim 13, wherein said electromagnetic radiation is selected from a group consisting of infrared radiation, ultraviolet radiation, and radio waves.

15. A method for attenuating light, comprising the steps of:
    (a) selecting a first polarizing element having a first polarization vector field that varies spatially across said first polarizing element;
    (b) selecting a second polarizing element having a second polarization vector field that varies spatially across said second polarizing element, wherein said second polarization vector field is adapted to being in alignment with said first polarization vector field;
    (c) aligning said first polarizing element and said second polarizing element in a series wherein said first polarizing element is parallel to said second polarizing element and said first polarizing element is separated from said second polarizing element by a pre-defined distance, and
    (d) crossing gradually said first polarization vector field with said second polarization vector field thereby gradually attenuating light passing through said first polarizing element and said second polarizing element by mechanically translating said first polarizing element along a vertical axis in relation to said second polarizing element.

16. The method for attenuating light of claim 15, wherein first polarization vector field is defined as $\vec{f}(x,y)=(\cos(\omega \cdot y), \sin(\omega \cdot y))$.

17. The method for attenuating light of claim 15, wherein said second polarization vector field is defined as $\vec{f}(x,y)=(\cos(\omega \cdot y), \sin(\omega \cdot y))$.

18. The method for attenuating light of claim 15, further comprising the step of:
 (e) translating said first polarizing element in relation to said second polarizing element such that said first polarization vector field is crossed at a relative angle of 90 degrees with said second polarization vector field, thereby blocking the light from passing through said second polarizing element.

19. The method for attenuating light of claim 15, wherein said step (d) mechanically translates said first polarizing element by a mechanical means selected from the group consisting of:
 a motor and a gear box, a handle, and a threaded thumb screw operatively connected to one or more tensioning springs.

* * * * *